United States Patent
Ahuja et al.

(10) Patent No.: US 10,841,256 B2
(45) Date of Patent: Nov. 17, 2020

(54) UPGRADING COMPONENTS OF A MESSAGING SYSTEM USED BY A MICROSERVICE-BASED APPLICATION

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Meni Hillel, San Jose, CA (US)

(73) Assignee: ShieldX Networks, Inc., San Jose, CA (US)

( * ) Notice: Subject to any disclaimer, the term of this patent is extended or adjusted under 35 U.S.C. 154(b) by 0 days.

(21) Appl. No.: 15/588,527

(22) Filed: May 5, 2017

(65) Prior Publication Data

US 2018/0324119 A1    Nov. 8, 2018

(51) Int. Cl.
| | |
|---|---|
| H04L 29/06 | (2006.01) |
| H04L 12/58 | (2006.01) |
| H04L 29/08 | (2006.01) |
| G06F 8/60 | (2018.01) |
| G06F 8/65 | (2018.01) |
| G06F 8/71 | (2018.01) |

(52) U.S. Cl.
CPC ............ *H04L 51/046* (2013.01); *G06F 8/60* (2013.01); *G06F 8/65* (2013.01); *H04L 63/0236* (2013.01); *H04L 63/0245* (2013.01); *H04L 63/0254* (2013.01); *H04L 63/0428* (2013.01); *H04L 67/34* (2013.01); *G06F 8/71* (2013.01); *H04L 69/16* (2013.01)

(58) Field of Classification Search
CPC ..................................................... H04L 51/046
See application file for complete search history.

(56) References Cited

U.S. PATENT DOCUMENTS 5,974,428 A * 10/1999 Gerard ............... G06F 8/71
707/695
9,467,476 B1 * 10/2016 Shieh ............... H04L 63/20

* cited by examiner

*Primary Examiner* — Adnan M Mirza
(74) *Attorney, Agent, or Firm* — Nicholson De Vos Webster & Elliott LLP

(57) ABSTRACT

Systems, methods, and apparatuses enable a microservice-based application to dynamically update components of the system without disrupting messaging occurring between microservices in the system. Microservices of a microservice-based application store data indicating mappings between data object versions and message object versions and which is used update system components in a controlled manner. As used herein, a data object generally refers to any data generated by a microservice and that can be sent to one or more other microservices using a publish-subscribe messaging pattern or other messaging architecture. A message object refers to data used to encapsulate one or more data objects and used to send the data object from one component to another in the system.

20 Claims, 14 Drawing Sheets

UPGRADING COMPONENTS OF A MESSAGING SYSTEM USED BY A MICROSERVICE-BASED APPLICATION

TECHNICAL FIELD

Embodiments relate generally to computer network security. More specifically, embodiments relate to techniques for updating components of a messaging system used by a microservice-based application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Most businesses and other organizations today rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, and so forth.

DETAILED DESCRIPTION

Figure 1:
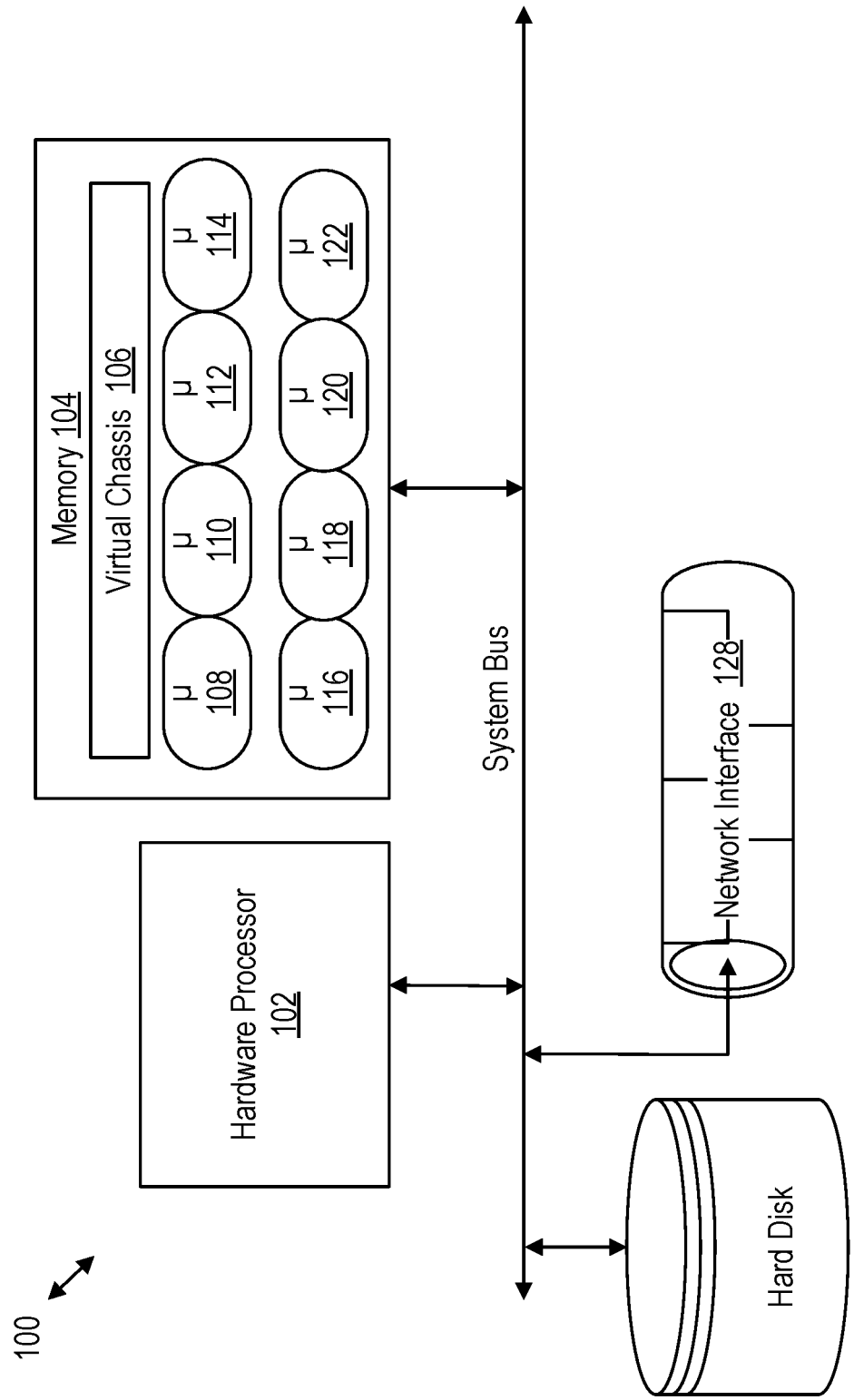
FIG. 1 is a block diagram illustrating computer hardware for loading network security system microservices from a memory and executing them by a processor in accordance with the disclosed embodiments.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form to avoid unnecessarily obscuring embodiments of the present invention.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments are described herein according to the following outline:

1.0. General Overview
2.0. Operating Environment
2.1. System Overview
2.2. Microservice-based Messaging System Overview
2.3. Support for Multiple Object Versions in a Messaging System
3.0. Functional Overview
4.0. Example Embodiments
5.0. Implementation Mechanism—Hardware Overview
6.0. Extensions and Alternatives

1.0. General Overview

Modern data centers and other computing environments can include anywhere from a few computer systems to thousands of systems configured to process data, service requests from remote clients and other applications, and perform numerous other computational tasks. The large number of interworking systems, applications, etc., make such computing environments susceptible to a wide variety of network security threats and other issues. Several network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, and so forth.

The type of network security tool described above is useful for providing a variety of network security functions as a single unit. However, efficiently scaling these types of network security tools is often challenging. For example, if a particular computer environment might benefit from increased firewall resources, a system administrator may install one or more additional hardware units each including firewall services in addition to a suite of other network security functions. While the addition of these new hardware units may meet the increased firewall resource needs, some of the hardware units may include unnecessary or underutilized resources devoted to virtual private network (VPN) services, data loss prevention (DLP) services, or other security services.

One way in which many modern computing environments scale resources more efficiently is using virtualized computing resources. A virtualized computing resource generally refers to an abstracted physical computing resource presented to an operating system and its applications by means of a hypervisor, such that the virtual computing resources (compute, memory, network connectivity, storage, etc.) are configurable and may be different from those of the physical computing resource. According to one embodiment, these types of virtualized infrastructures are used to efficiently scale network security applications based on the use of "microservices," where a microservice is a particular type of virtualized computing resource packaged as a software container. For example, a network security platform may comprise separate microservices providing firewall resources, DLP services, VPN services, etc. In general, the use of such microservices can provide greater flexibility because the microservices can be more easily deployed and scaled in response to variable demands for various types of network security services.

The type of efficient network security application scaling described above can be achieved with the use of a security application that is configured to scale network security services using microservices. Although many of the techniques described herein are explained with reference to a microservice-based network security application, the techniques are also applicable to other types of network security systems.

2.0. Operating Environment 2.1. System Overview

FIG. 1 is a block diagram illustrating an embodiment of a scalable microservice architecture using microservices. Network security system microservices 108-122 are stored in memory 104 (e.g., volatile memory such as Random Access Memory (RAM) or non-volatile memory such as disk) and executed by one or more hardware processors or processor cores 102. Network security system microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which is also a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs, memory, or both, are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
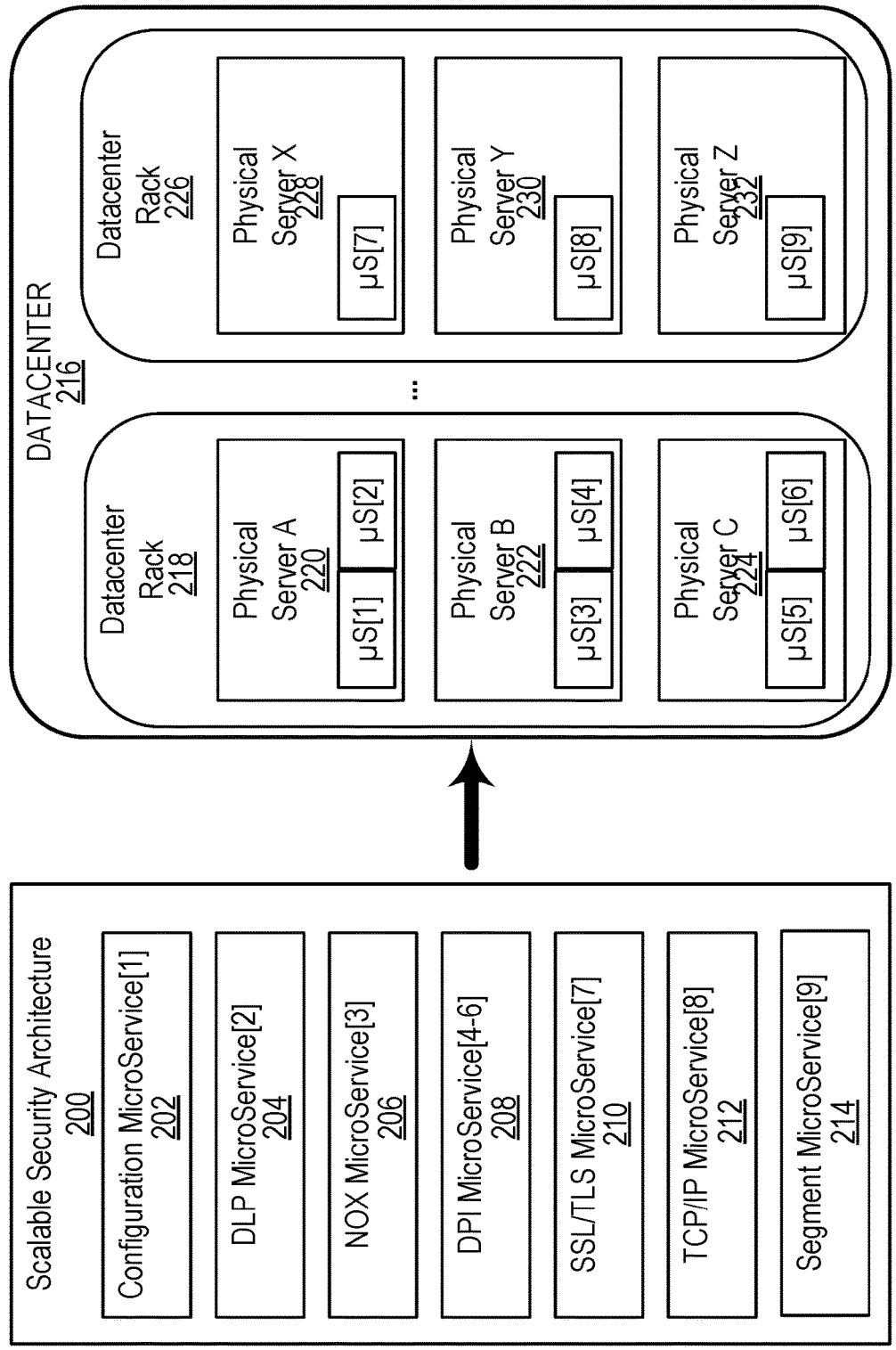
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3X, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
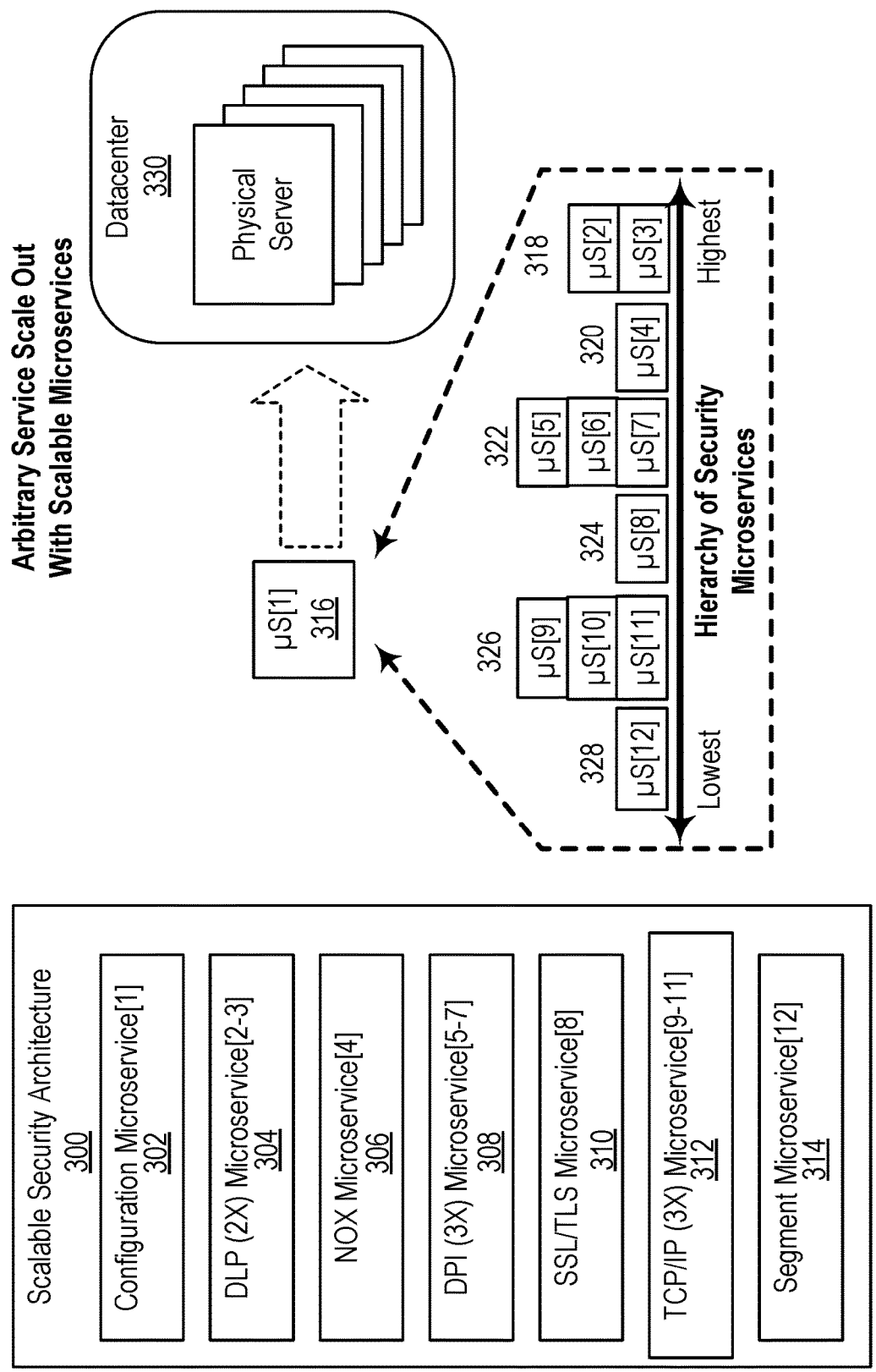
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
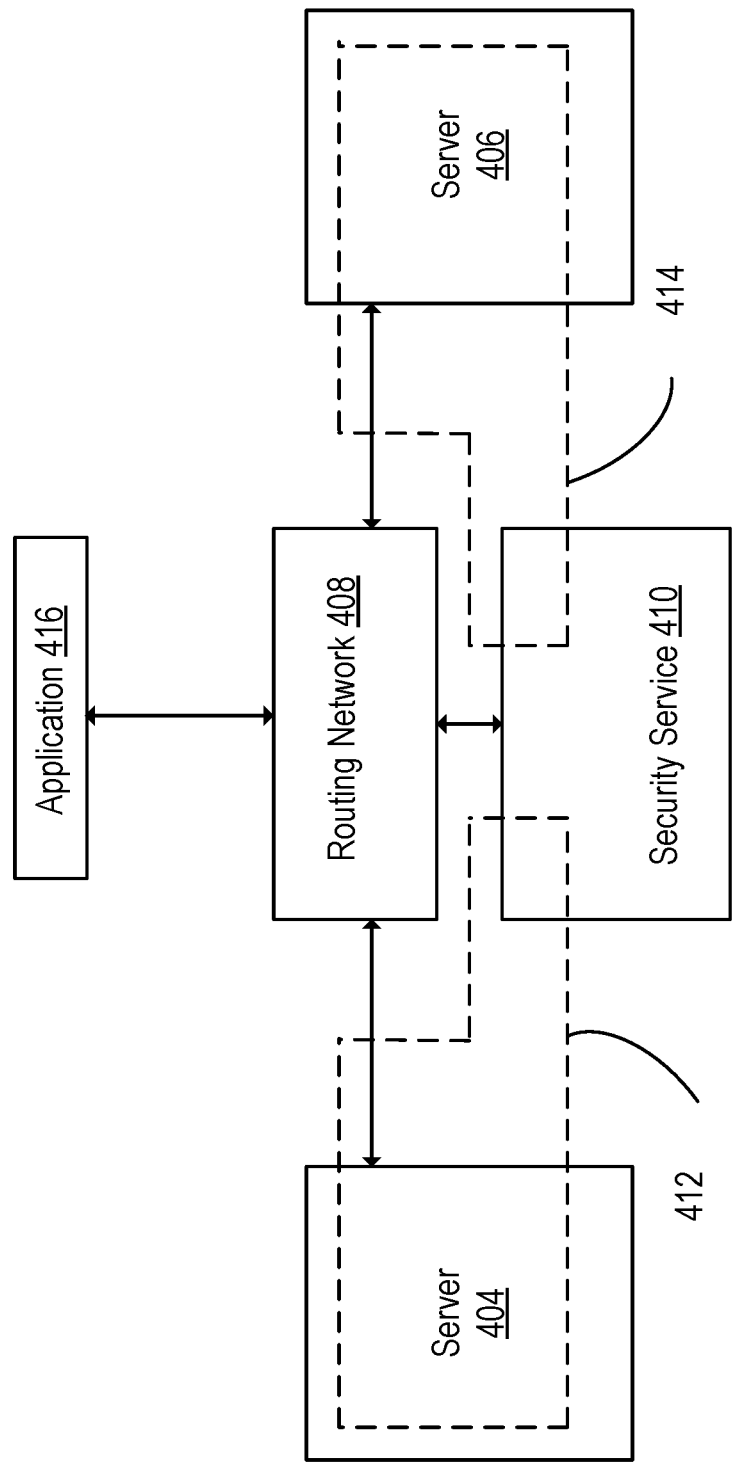
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 may not be confined to one physical server such as a server 404, 406. For example, one or more microservices of the security service 410 may be executed on server 404, and other microservices of the security service 410 may be executed on server 406. In some embodiments, the security service 410 is executed on a different server from one or more servers for which the security service is responsible for monitoring and protecting.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
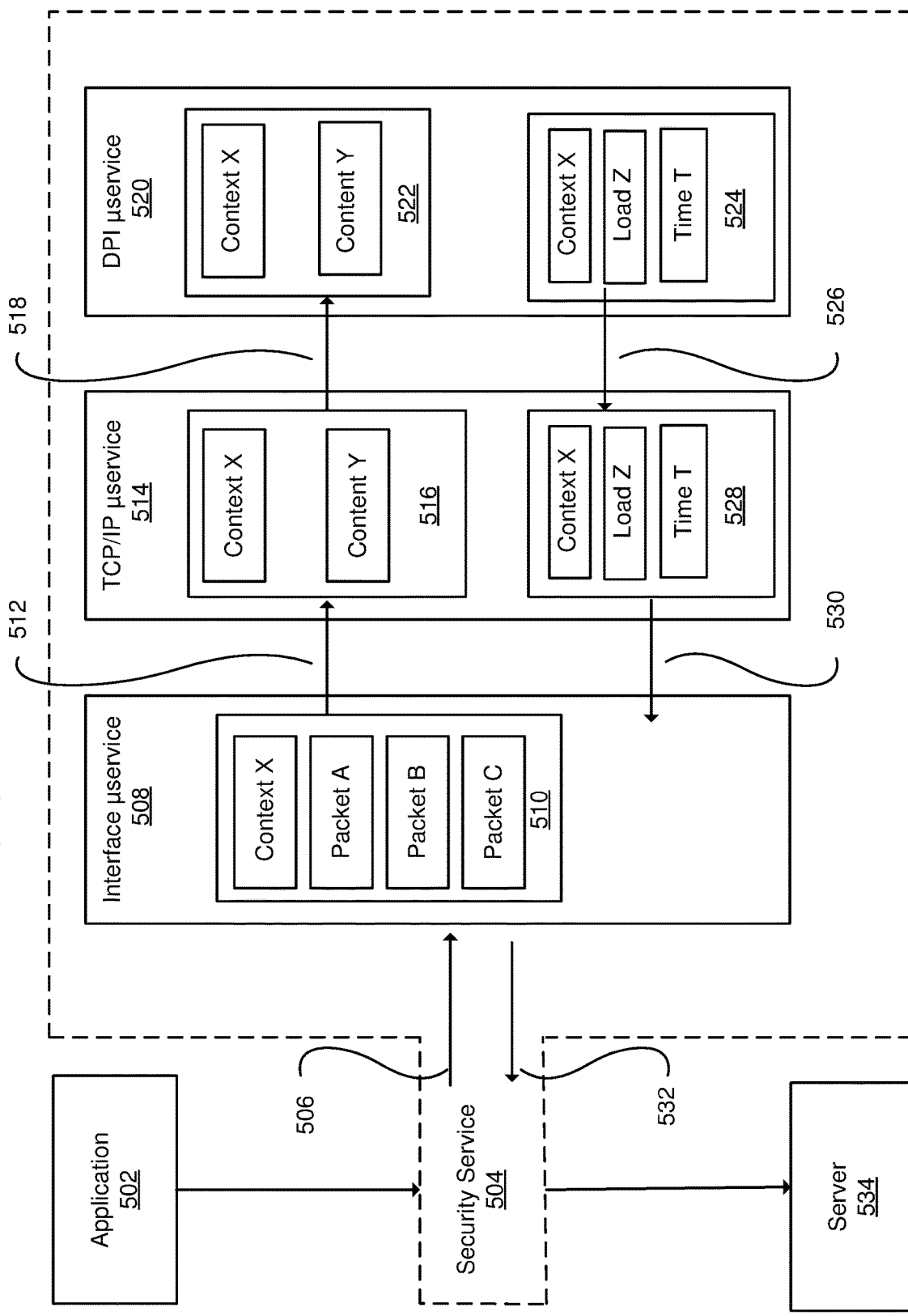
FIG. 5 is a block flow diagram illustrating application data traversing to a server after passing through a hierarchy of a security microservices in accordance with the disclosed embodiments.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
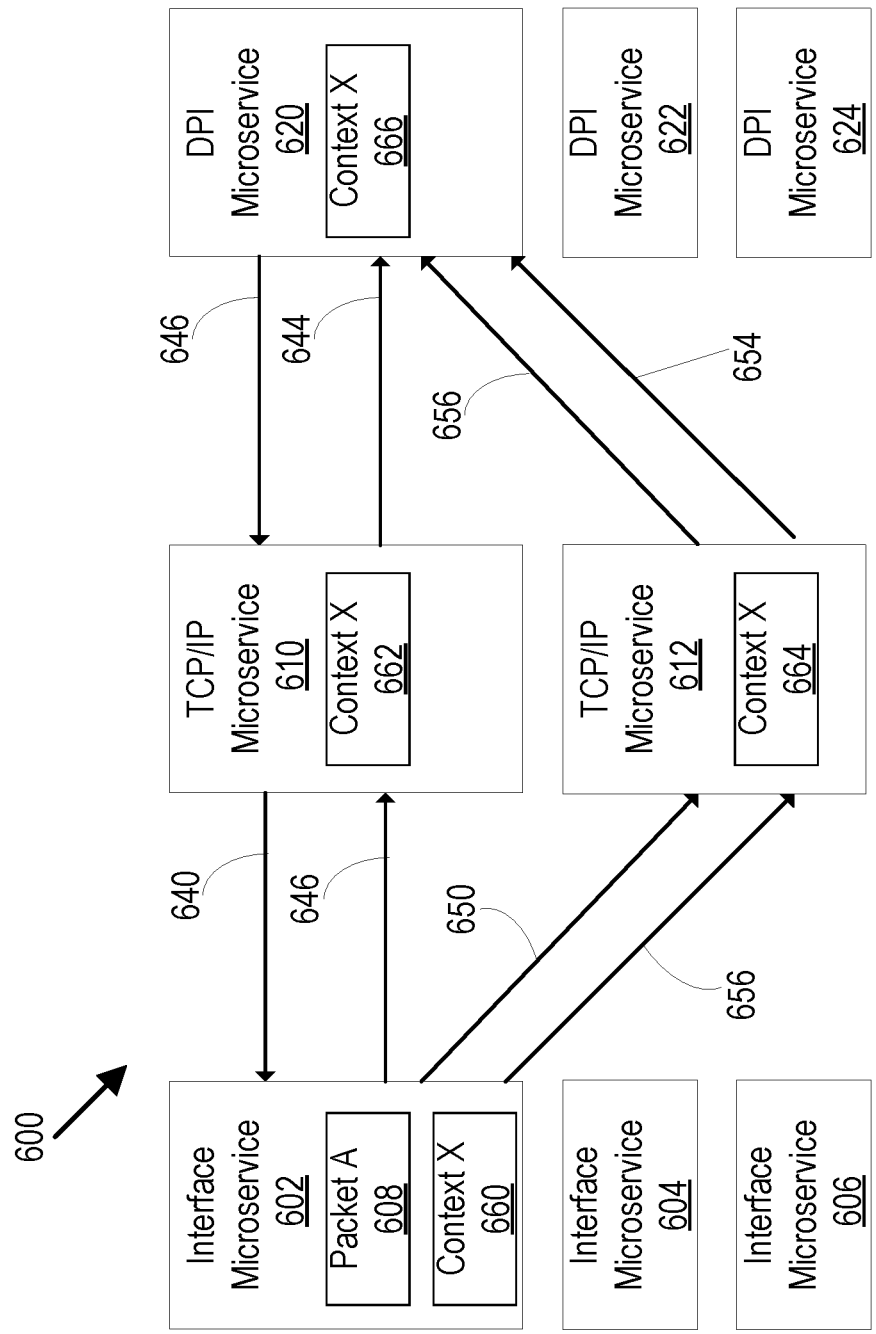
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices, different types microservice types, or both. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

2.2. Microservice-Based Based Messaging System Overview

According to embodiments described herein, a microservice-based system can include components that enable microservices of the system to communicate with each other and with other system components. For example, a microservice-based system can include any number of microservices running on one or more separate physical and virtual machines. Microservices in such systems might communicate with one another and with other system components to exchange data, signaling, and any other information used to process information in a distributed manner. This communication may be performed point-to-point (such as from one microservice to another microservice), point-to-multipoint (such as from one microservice to a plurality of microservices), synchronously or asynchronously, with or without guaranteed delivery, with or without receipt confirmation and according to additional parameters or configuration appropriate for the type of message and information content.

In one embodiment, a microservice-based system includes one or more microservices, referred to herein as communication microservices, that facilitate communication between microservices of a microservice-based system. For example, a communication microservice might implement a publish-subscribe messaging pattern or other messaging architecture to manage system communications. Using a publish-subscribe messaging paradigm, microservices can send messages destined for one or more other microservices or system components to a centralized communication microservice. A communication microservice can characterize messages received from microservices into message classes, also referred to herein as a "topics," but without specifically directing the messages to one or more receiving microservices (called subscribers). Similarly, microservices can express interest in receiving messages associated with one or more topics, but without specifying specific microservices from which the messages originate. Thus, when one or more microservices publish a message a topic, each of the microservices subscribing the topic can receive the message and act on the received message accordingly. Although many of the examples described herein are described in relation to a publish-subscribe messaging system, other messaging systems can also be used to implement the described embodiments.

In some embodiments, a publish-subscribe paradigm is utilized in a hierarchical messaging system such that topics are members of groups. In such embodiments, subscribing to a group constitutes subscribing to all topics within the group. In some embodiments, messaging systems utilize bridges (translation services) operative between or among messaging formats to allow messages from one service to be delivered to another service and the appropriate reply, if necessary, to be returned. Such bridges may employ transformations of the message format, message data or both.

Various components of a microservice-based messaging system can be versioned. As described above, the microservices in the system can generate data objects that are sent to other microservices in the system for processing. A data object generally can include any data (e.g., a Java object, an XML object, etc.) generated by a microservice. In one embodiment, data objects generated by a microservice can be associated with a data object version. As used herein, a data object version generally indicates a set of functionality, formatting, or other characteristics associated with the data objects generated based on the data object version. Data object versions can be updated over time to add, remove, or modify the characteristics of the data object and each update can be associated with a different data object version (e.g., an update to version "v1" can be labeled "v2").

In an embodiment, various components of a microservice-based messaging system can also generate message objects. As used herein, a message object is used to encapsulate one or more data objects with information that enables data object(s) to be communicated in the system. For example, a message object can include topic information, information about the originating microservice, timestamps, and any other information related to the data object(s) encapsulated by the message object. In an embodiment, a message object can be associated with a message object version that is distinct from a data object version of data object(s) encapsulated by the message object. Similar to data object versions, message object versions can be upgraded over time to add, remove, or modify characteristics of the message objects.

According to embodiments described herein, a microservice-based messaging system is configured to support the concurrent existence of multiple versions of messaging system components (e.g., versions using different data object versions, message object versions, or both). In many conventional systems, a process for upgrading one component of a messaging system (e.g., resulting in an updated data object version, message object version, or both) typically involves shutting down the entire system of microservices, upgrading each component of the system to a compatible version while the system is shut down, and finally restarting the system. While this upgrade process can help to ensure that component versions of the system remain synchronized, shutting down and restarting the entire system each time an upgrade is available can waste valuable computing time and resources. Thus, the ability to concurrently support the existence of multiple versions of messaging system components can enable upgrading components of the system in a piecemeal fashion to better maximize the resources of the system.

Figure 7:
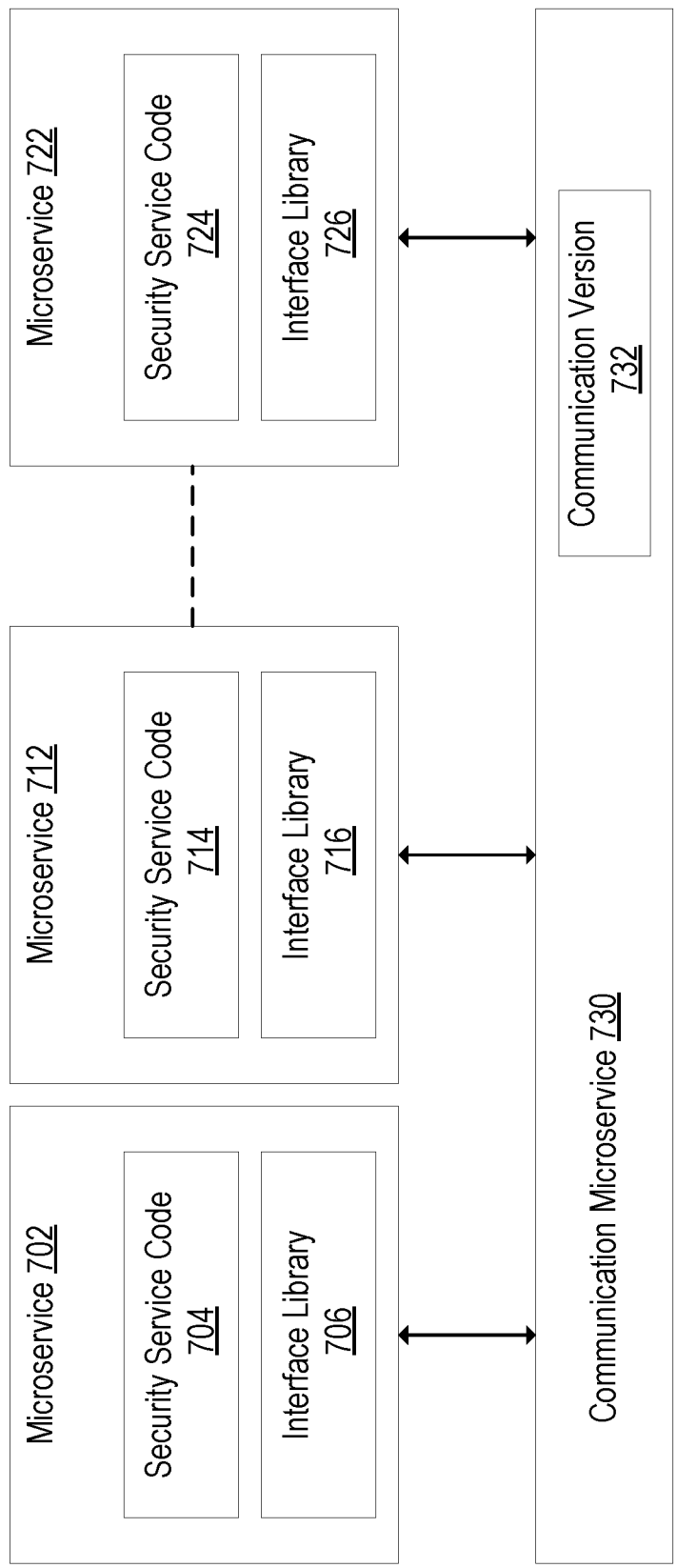
FIG. 7 is a block diagram illustrating components of a messaging system used by a microservice-based application in accordance with the disclosed embodiments.

FIG. 7 illustrates example components of a microservice-based system including a plurality of microservices which communicate via a communication microservice. In FIG. 7, for example, each of microservices 702, 712, ... and 722 can send and receive messages to one another and to other system components via a communication microservice 730. As described above, in one embodiment, a communication microservice 730 implements a publish-subscribe messaging pattern, where the microservices of the system can publish messages to topics and subscribe to selected topics to receive messages published by other microservices to the selected topics.

In one embodiment, each microservice includes security service code and an interface library, among other possible components. For example, in FIG. 7, a microservice 702 includes security service code 704 and an interface library 706; a microservice 712 includes security service code 714 and an interface library 716; and a microservice 722 includes security service code 724 and an interface library 726.

In one embodiment, security service code can include any code that a microservice uses to perform various types of security services (e.g., SSL services, DPI services, DLP services, etc.). The security service code communicates with other system components using an interface library. At a high level, an interface library can include various types of functionality that enable the security services code to send and receive messages with other elements of the system. For example, an interface library might include an API which enables a microservice to send messages, receive messages, and which standardizes a format for messages sent in the system (e.g., by encapsulating data objects generated by the security service code in a message object format, as described in more detail in reference to FIG. 8).

In one embodiment, a communication microservice 730 is associated with a communication version 732. A communication version refers to a version of the messaging protocol(s) supported by the communication microservice 730. For example, a communication version 732 might indicate that the communication microservice 730 only supports messages formatted with a message object version "2.0," or might indicate that message object versions "3.1" or higher are supported, and so forth.

Figure 8:
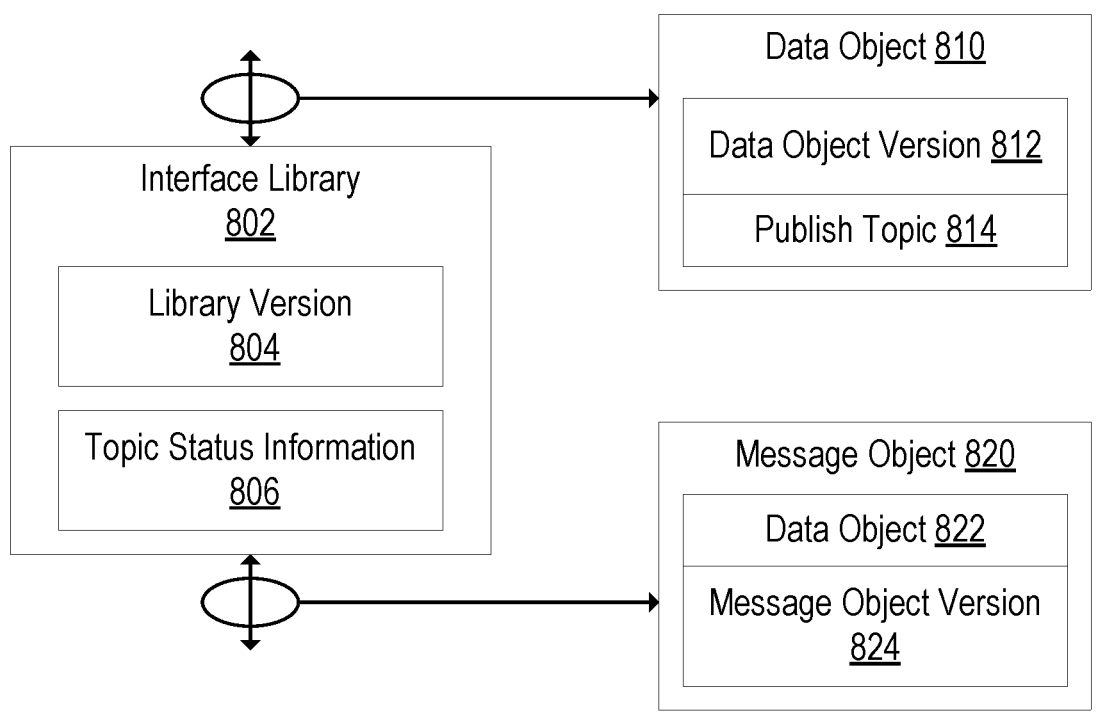
FIG. 8 is a block diagram illustrating components of an interface library used by a microservice to send and receive message objects in accordance with the disclosed embodiments.

FIG. 8 illustrates additional details related to an interface library (e.g., interface library 706 of microservice 702). In an embodiment, an interface library 802 includes a library version 804 and topic status information 806. In an embodiment, a library version 804 indicates a version of the interface library, thereby identifying a format used by the interface library 802 to generate message objects (e.g., a message object 820) based on data objects (e.g., a data object 810) received from the security service code running on the microservice.

In an embodiment, an interface library 802 uses topic status information 806 to track one or more topics used by the associated microservice. As described above, a topic is a feature of a publish-subscribe messaging architecture that enables the exchange of messages between various microservices and other system components via a centralized communication microservice. As one example, one topic stored as part of topic status information 806 might be "errors." In this example, each time security service code of the associated microservice encounters an error condition, the code can generate a data object 810 related to the error condition and publish the data object to the "errors" topic. In response to the interface library 802 publishing the message object to the "errors" topic, one or more microservices subscribing to the "errors" topic can receive (e.g., via the communication microservice 730) the error message and perform actions in response to the error condition.

As shown in FIG. 8, an interface library 802 can be considered to have a "top-end" and a "bottom-end," where the top-end interfaces with security services code running at the associated microservice. In this manner, the top-end receives data objects (e.g., a data object 810) generated by the security service code, where the data objects are associated with a data object version 812 and a publish topic 814. As described above, a publish topic 814 can indicate a topic of the publish-subscribe messaging architecture with which the message is to be associated for receipt by any microservices subscribing the same topic.

In an embodiment, the bottom-end of the interface library 802 interfaces with a communication microservice to send and receive message objects. As shown in FIG. 8, a data object 810 can be encapsulated in a message object 820. A message object 820 includes a data object 822 and a message object version 824, among other possible data including other control data.

2.3. Support for Multiple Object Versions in a Messaging System

During operation of a microservice-based system, updates may become available for one or more components of the system. For example, in reference to the microservice-based system shown in FIG. 7, an update to the microservice 702 might become available at some point during the operation of the system. The update might include changes to the security service code 704, interface library 706, or both.

In the example above, if the microservice 702 publishes a data object to the "errors" topic after the update is installed, the updated version of the microservice 702 might use a different data object version, message object version, or both, than was used prior to the update. Furthermore, the data object version or message object version of the error message used by microservice 702 might now be different from that of microservices 712 and 722. This situation may cause the message to be dropped, unprocessed, or otherwise operate in an unexpected manner when received by the communication microservice 730 and other microservices 712 and 722.

Figure 9:
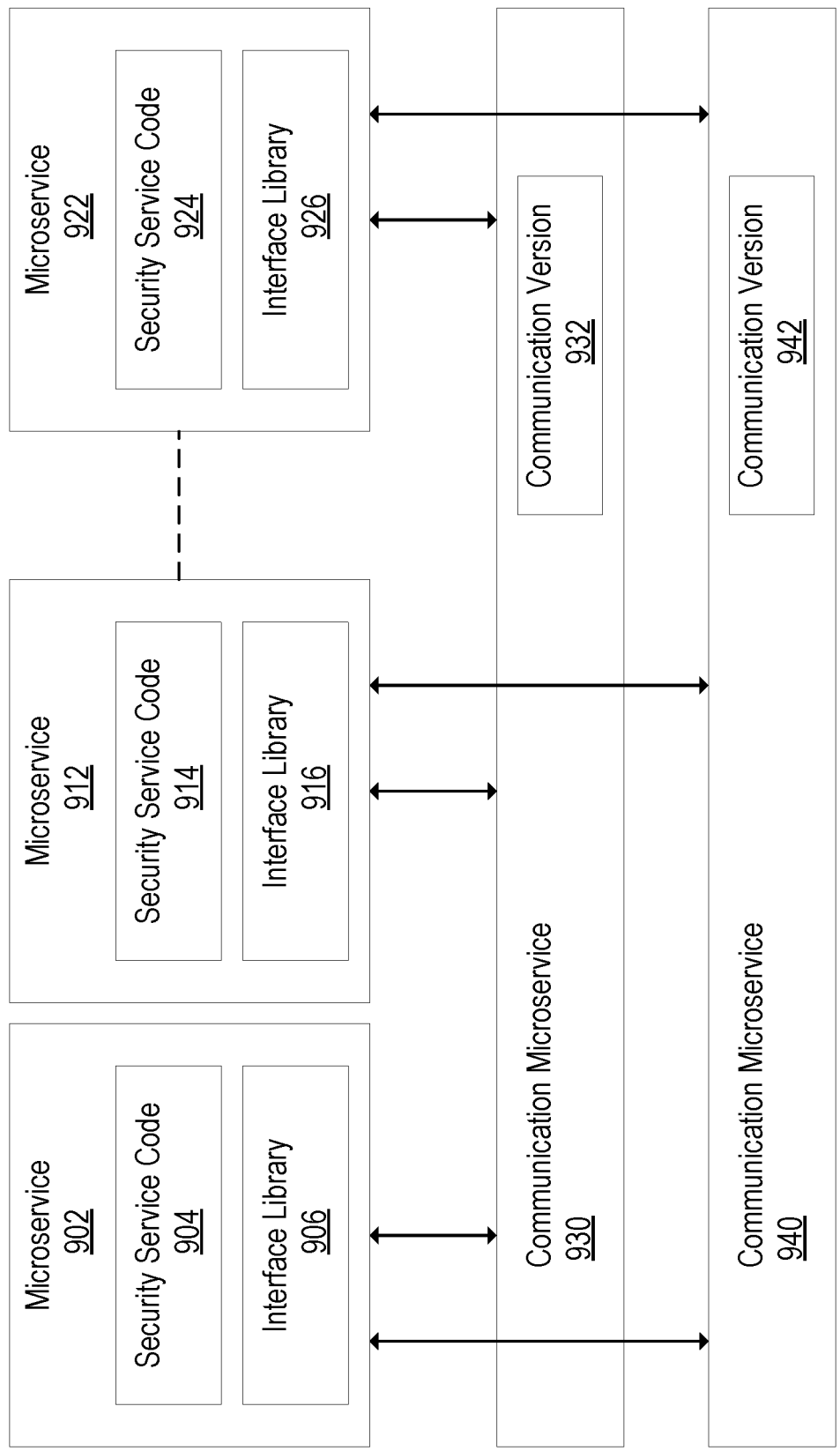
FIG. 9 is a block diagram illustrating using multiple communication microservices to enable upgrading a microservice messaging system in accordance with the disclosed embodiments.

According to one embodiment, a microservice-based messaging system can support the concurrent operation of multiple object versions using the system arrangement illustrated in FIG. 9. At a high level, the microservices of the system illustrated in FIG. 9 use a mapping maintained between data object versions and message object versions to determine which communication microservice (of possibly a plurality of concurrently executing communication microservices) can be used to send and receive messages associated with particular object version combinations. In an embodiment, the system also tracks statistics related to how many messages associated with each object version are currently in process by any component of the system. Based on these tracked statistics, the system can detect when an older object version update is no longer in use (e.g., because all components associated with the older object version have been upgraded). In response to determining that the older object version is no longer in use, the system can retire communication microservices supporting the older object version. In this manner, updates to microservices and other system components can be applied in a piecemeal fashion and without halting the operation of the entire system, thereby better maximizing the use of available computing resources.

In FIG. 9, for example, a communication microservice 930 might support an older message object version (e.g., up to a version "6.0") relative to a newer message object version (e.g., message object version "7.0") that is now being used by one or more of the microservices 902, 912, . . . 922 after an update to those microservices. According to embodiments described herein, to support the newer message object version "7.0," a communication microservice 940 supporting the newer message object version is instantiated. The communication microservice 930 supporting the older message object version "6.0" can be kept in service until any remaining microservices using the older message object version are updated.

Figure 10:
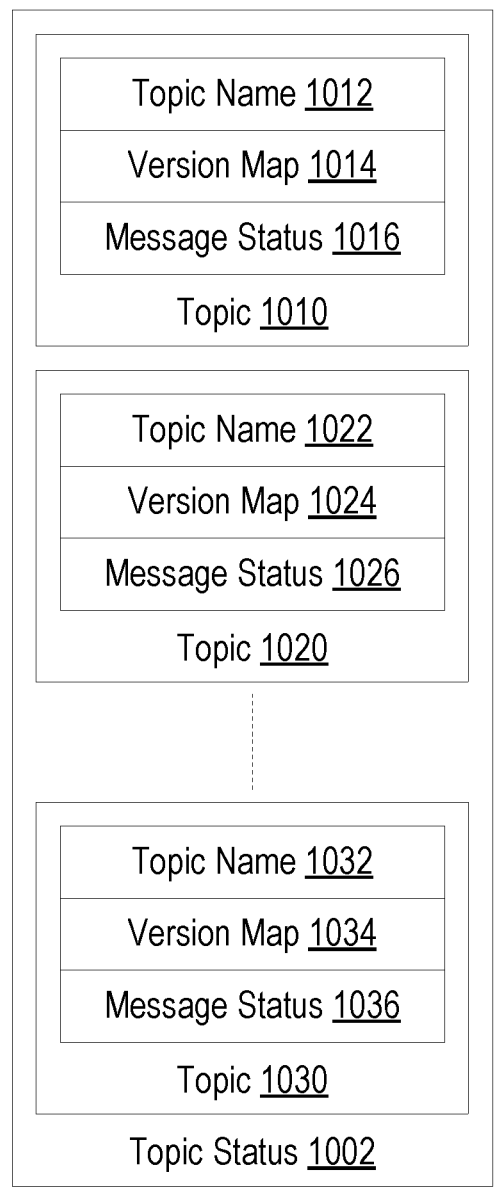
FIG. 10 is a block diagram illustrating topic status information in accordance with the disclosed embodiments.

FIG. 10 illustrates topic status information that enables microservices to track which versions of message objects are sent to which communication microservices. For example, topic status information 1002 can be stored as part of an interface library 802, as shown in FIG. 8, or as part of any other component in the microservice-based system. In FIG. 10, each topic item 1010, 1020, . . . 1030 includes a topic name, a version mapping, and a message status. For example, topic item 1010 includes a topic name 1012, a version map 1014, and a message status 1016; topic item 1020 includes a topic name 1022, a version map 1024, and a message status 1026; and topic item 1030 includes a topic name 1032, a version map 1034, and a message status 1036.

In one embodiment, a topic name can be any type of label or other identifier of the topic represented by the topic entry. For example, a topic label could be "errors," "logins," "topic2," or any other topic identifier. In one embodiment, a message status can include additional information related to messages associated with the corresponding topic. Additional information may include information associated with the count, duration or size of messages that have been send and received for the topics. Such additional information may be used to associate use and resource metrics for the topic and estimate the time or resources required to maintain two versions of the topic at the same time. Additional information may include queueing metrics such as high and low watermarks. Such information may be used to estimate the time that two versions of the topic would have to be maintained.

Figure 11:
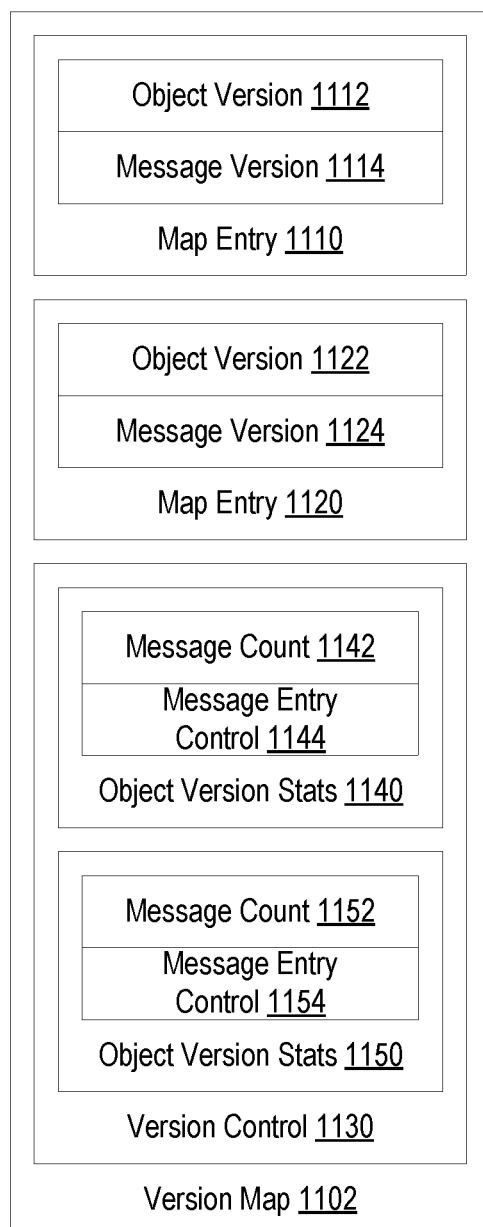
FIG. 11 is a block diagram illustrating object version mapping information in accordance with the disclosed embodiments.

In an embodiment, each topic entry in FIG. 10 also includes a version map (e.g., version map 1014 of topic entry 1010). A more detailed example of a version map is illustrated in in FIG. 11. As shown in FIG. 11, version map information 1102 includes one or more map entries (e.g., map entry 1110 and map entry 1120), each of which indicates that for data object version X, a message object version Y is to be used. For example, map entry 1110 has an object version 1112 mapped to a message version 1114, and map entry 1120 has an object version 1122 mapped to a message version 1124. In an embodiment, when a microservice receives a data object from security service code, the microservice can examine the map entries to determine which message object version to use to send the data object version in the system. Similarly, when a microservice receives a message object from a communication microservice, the microservice can use the map entries to determine a data object version encapsulated by the message object.

In an embodiment, each object version optionally has an object versions statistics entry associated with it (e.g., object version statistics entry 1140 and 1150). These object version statistics entries are stored as part of a version control entry 1130. In an embodiment, a version control entry 1130 enables a microservice to determine a number of messages that are currently in process for a data object version. In an embodiment, an object version statistics entry further includes a message entry control (e.g., message entry control 1144 of object version statistics entry 1140) which indicates one or more operations to perform when an associated message count reaches zero. For example, the message entry control might indicate that the microservice is to switch to a newer message object version when the associated message count reaches zero, to retire an existing communication microservice supporting the older message object version, or any other operations.

As an example, a data object version A might initially be supported by a message object version X, and a different data object version B might be supported by message object version Y. It might be desired at some point to migrate any microservices using object version A to use message version Y. In this example, a microservice can use the object version statistics associated with the data object version A to track how many messages associated with message object version X are outstanding. In response to the microservice determining that no messages associated with data object version A are outstanding, the microservice can update the mapping to indicate that message object version Y is to be used for future messages. In this example, the update to message object version Y might include instructing the microservice to send future messages to a different communication microservice that supports the newer message object version Y.

3.0. Functional Overview

Approaches, techniques, and mechanisms are disclosed that enable a microservice-based application to dynamically update components of the system without disrupting messaging occurring between microservices in the system. According to embodiments described herein, microservices of a microservice-based application store data indicating mappings between data object versions and message object versions and which is used update system components in a controlled manner. As used herein, a data object generally refers to any data generated by a microservice and that can be sent to one or more other microservices using a publish-subscribe messaging pattern or other messaging architecture. A message object refers to data used to encapsulate one or more data objects and used to send the data object from one component to another in the system.

As indicated above, microservices of a microservice-based system can use version mapping information to perform operations in response to determining particular conditions related to messages in the system. In one embodiment, in response to a microservice receiving a message object from a communication microservice, the microservice can determine a topic associated with the message object. Based on determining the topic associated with the message object, the microservice can identify version mapping data identifying a data object version associated with the message object. Based on the version mapping data, the microservice can examine statistics associated with the message object and data object versions. In an embodiment, if a microservice determines that there are currently zero messages associated with a particular version in process, and if the system is configured to update one or more version mappings when it is determined that zero messages associated with a particular version are in process, the microservice can update the version mapping to the newer version without disrupting any existing messages. In this example, subsequent messages can be mapped to the newer object version and possibly sent using a different communication microservice that supports the newer version.

Figure 12:
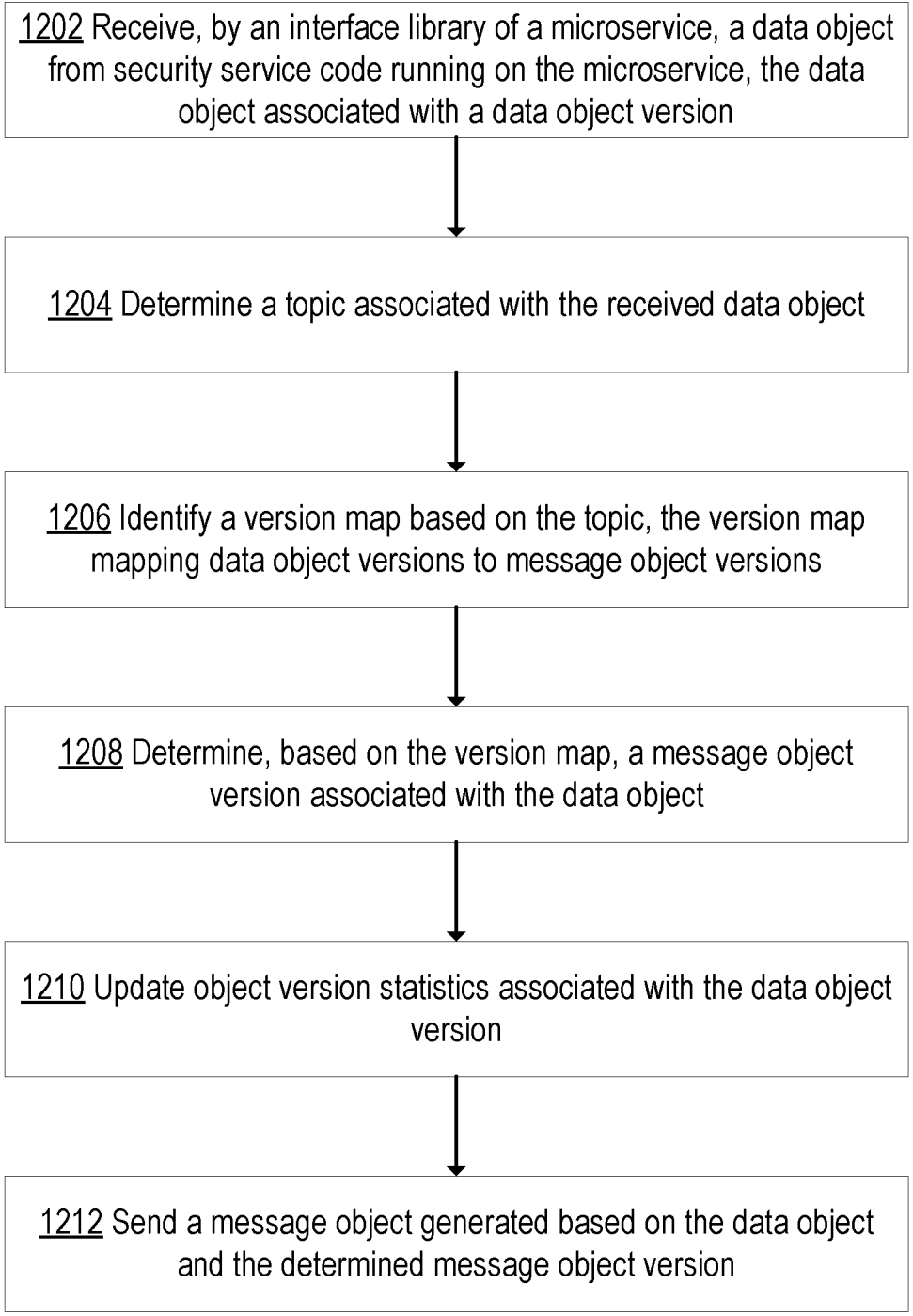
FIG. 12 is a flow diagram illustrating an example method of a microservice sending a message in accordance with the disclosed embodiments.

FIG. 12 is a flowchart illustrating a process used by microservices to send data objects in a microservice-based system according to embodiments described herein.

At block 1202, an interface library of a microservice receives a data object. For example, in reference to FIG. 7, an interface library 706 might receive a data object from security service code 704. The data object generally can be any data generated by the security service code 704 and which is to be sent to another component of the microservice-based system. As shown in FIG. 8, a data object can be associated with a data object version 812 and a publish topic 814 among other data. The data object version can be any identifier of a version associated with the data object. The publish topic indicates a topic (e.g., "errors," "logins," etc.) of a publish-subscribe messaging architecture with which the message is to be associated so that any microservices subscribing to the same topic can receive the message.

At block 1204, the interface library determines a topic associated with the data object received from the security service code. In one embodiment, the topic can be specified explicitly as part of the data object. As described above, the data object might include a publish topic field or other data explicitly identifying the topic (e.g., an XML object might include an XML element identifying a topic). Additionally or alternatively, a topic might be determined based on characteristics of the object. For example, an interface library might be configured to automatically associate data objects received from particular tasks with a particular topic (e.g., any data object received from an error checking task might be automatically associated with an "errors" topic).

At block 1206, the interface library identifies a version map based on the topic determined at block 1204. Referring to FIG. 10, for example, a version map can be determined by locating a topic entry in topic status information 1002 that includes a topic name matching the topic determined at block 1204. As shown in FIG. 11, a version map includes one or more map entries, each of which indicates a mapping between a data object version and a message object version. A version map further includes version control information 1130 used to determine whether to update one or more of the mappings between data object versions and message object versions, as described in more detail below.

At block 1208, the microservice determines a message object version from the version map. For example, referring again to the example version map 1102 in FIG. 11, the microservice can translate the data object version to a message object version using a matching map entry (e.g., one of map entry 1110 and map entry 1120) of the version map 1102.

At block 1210, the interface library updates statistics for the data object version, the message object version, or both. In one embodiment, the update to the statistics generally indicates that there is now an additional data object associated with the data object version currently in process by one or more microservices of the microservice-based system. For example, the microservice might increment a message count (e.g., message count 1142) to indicate that the additional data object is now in process. By updating the object version statistics when messages are sent and received, the microservice can track whether there are data objects associated with particular versions currently in process by the microservice-based system. As described in reference to FIG. 13, if a microservice determines that no data objects associated with a particular are currently in process, the microservice can determine whether to upgrade the microservice and use a newer data object version, message object version, or both.

At block 1212, the interface library sends the message to a communication microservice. For example, in reference to FIG. 9, the microservice can send the message object to either communication microservice 930 or communication microservice 940 depending on the message object version. For example, the microservice can send the message object to either communication microservice 930 or communication microservice 940 depending the communication version associated with each of the communication microservices.

Figure 13:
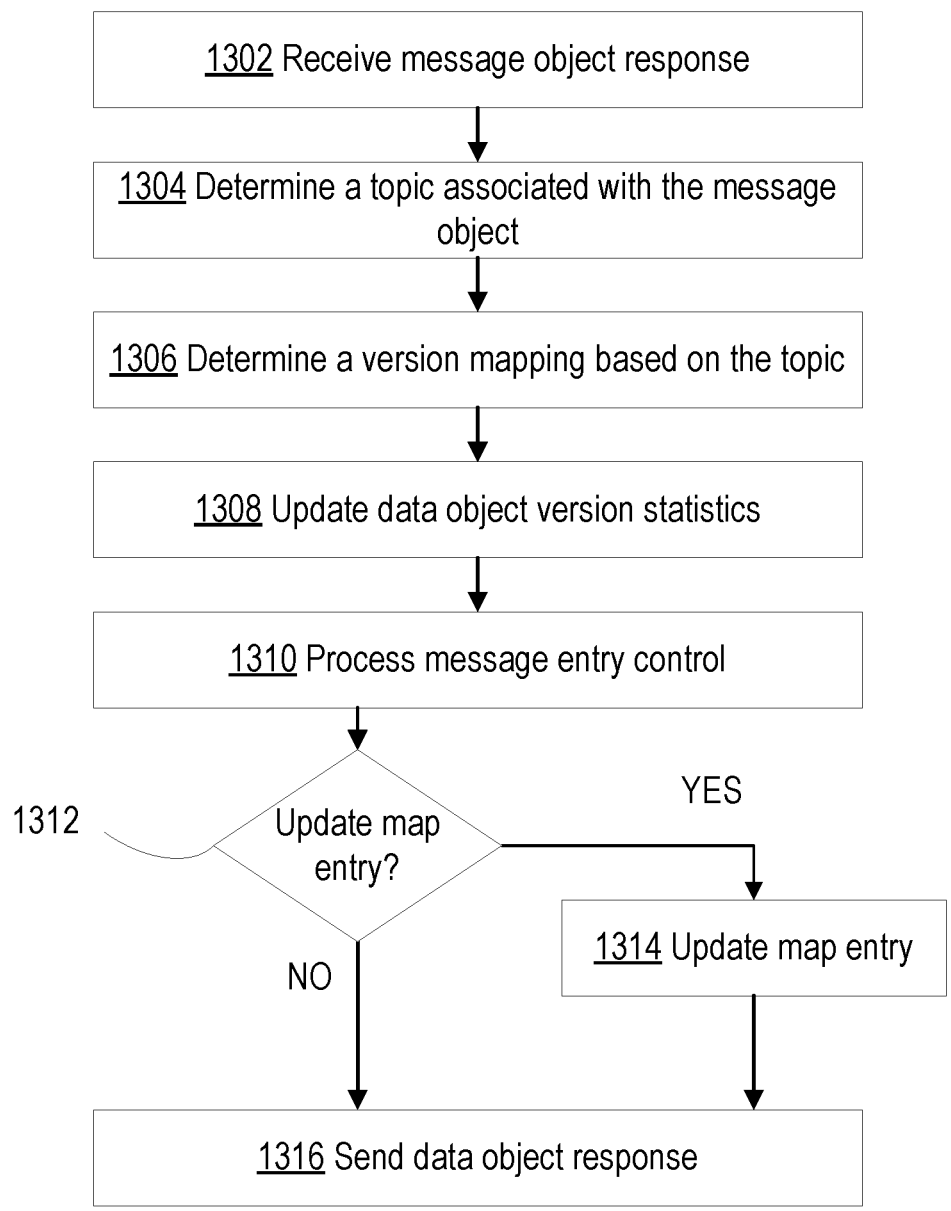
FIG. 13 is a flow diagram illustrating an example method of a microservice receiving a message object response in accordance with the disclosed embodiments.

FIG. 13 illustrates a process used by microservices receiving message objects from another microservice or other system component according to embodiments described herein. At a high level, in response to a microservice receiving a message object, the microservice can map a message object version associated with the message object to a data object version. Based on determining a data object version associated with the message, the microservice can determine whether to update one or more map entries associated with the object version. For example, if the microservice is pending an update to a newer data object version, the microservice can determine whether there are any remaining data objects associated with the existing data object version before updating.

At block 1302, a microservice receives a message object from a communication microservice. For example, referring to FIG. 9, one of microservices 902, 912, . . . 922 might receive a message object from one of communication microservice 930 and communication microservice 940. In the example of a publish-subscribe messaging architecture, the microservice might receive the message because the microservice is a subscriber to a topic associated with the message object.

At block 1304, the microservice determines a topic associated with the message object response. In an embodiment, the topic might be explicitly identified in the message object response or can be determined by examining characteristics of the message object response.

At block 1306, the microservice determines a version map based on the topic determined at block 1304. For example, referring to FIG. 10, the microservice can determine a version map by locating a topic entry that includes a topic name matching the topic identified at block 1304.

At block 1308, the microservice updates the data object version statistics. For example, referring to FIG. 11, the microservice can update object version statistics 1150 to reflect that the message object response has been received. For example, the microservice might maintain a message counter 1142 indicating a number of messages outstanding for each object version and can decrement the message counter 1142 in response to receiving the response message.

At block 1310, the microservice processes a message entry control associated with the received message object. For example, again referring to FIG. 11, the microservice can process a message entry control (e.g., message entry control 1144) in response to updating the data object version statistics. In an embodiment, the message entry control can include any logic that is performed in response to an update to the object version statistics. For example, a message entry control might indicate that one or more actions are to be performed by the microservice if the message count reaches zero or in response to any other condition.

At block 1312, the microservice determines whether to update one or more map entries associated with the received message object. For example, in response to processing the message entry control at block 1310, the microservice might determine that no messages for a particular object version are currently in process and the microservice can update the data object version, the message object version, or both, of one or more of the map entries to indicate that a newer object version is now in use. By updating the map entries, for example, the microservice can then be instructed to use a newer object version when sending and receiving subsequent messages.

At block 1314, if it determined at block 1312 to update one or more of the map entries, the microservice updates the one or more map entries. Referring to FIG. 11, for example, the microservice can update a corresponding one or more map entries to a new data object version, message object version, or both, depending on any updates.

At block 1316, the microservice sends the data object response to security service code of the microservice or to any other component of the microservice. For example, referring to FIG. 9, an interface library 906 of microservice 902 which has received a message object can send the resulting data object response to security service code 904 for further processing. In the example of FIG. 13, based on the update to the one or more map entries at block 1314, subsequent data objects sent by the microservice might use a newer data object version, message object version, or both, depending on any updates to the map entries.

4.0. Example Embodiments

Examples of some embodiments are represented, without limitation, by the following:

In an embodiment, a method or non-transitory computer readable medium comprises: receiving, by a microservice of a plurality of microservices, a message object from a first communication microservice of a plurality of communication microservices, wherein the message object is associated with a first message object version, and wherein the first communication microservice supports the first message object version; in response to receiving the message object associated with the first message object version, identifying: a version mapping that maps the first message object version to a data object version; and a statistics entry indicating a number of message objects associated with the data object version currently in process by any of the plurality of microservices; determining, based on the statistics entry, that the number of message objects associated with the data object version currently in process is zero; and based on the determination that the number of message objects associated with the data object version currently in process is zero, updating the version mapping from the first message object version to a second message object version.

In an embodiment, a method or non-transitory computer readable medium comprises: receiving a data object associated with the data object version, the data object to be sent to another security microservice of the plurality of microservices; determining, based on the version mapping, to use the second message version to encapsulate the data object as a message object; and sending the message object encapsulated using the second message version to a second communication microservice that is different from the first communication microservice.

In an embodiment, a method or non-transitory computer readable medium comprises: wherein identifying the version mapping further includes identifying a topic associated with the message object, where the topic is one of a plurality of topics of a publish-subscribe messaging system.

In an embodiment, a method or non-transitory computer readable medium comprises: sending a data object associated with the data object version to another process of the microservice.

In an embodiment, a method or non-transitory computer readable medium comprises: in response to receiving the message object associated with the first message object version, updating the number of message objects associated with the data object version currently in process by the plurality of microservices.

In an embodiment, a method or non-transitory computer readable medium comprises: wherein the statistics entry includes a message counter indicating the number of message objects associated with the data object version currently in process.

In an embodiment, a method or non-transitory computer readable medium comprises: generating, by a microservice of a plurality of microservices, a data object associated with a data object version; determining a topic associated with the data object, wherein the topic is one of a plurality of topics of a publish-subscribe messaging system; identifying, based on the determined topic, a mapping between the data object version and a message object version; updating statistics associated with the data object version to indicate that a message object encapsulating the data object version is being sent to a communication microservice; and sending the message object to the communication microservice.

In an embodiment, a method or non-transitory computer readable medium comprises: wherein the communication microservice is selected from a plurality of communication microservices based on a message object version associated with the message object.

In an embodiment, a method or non-transitory computer readable medium comprises: receiving, by the microservice, a message object associated with the message object version; in response to receiving the message object associated with the message object version, identifying: a version mapping that maps the message object version to a data object version; and a statistic entry indicating a number of message objects associated with the data object version currently in process by any of the plurality of microservices; determining, based on the statistics entry, that the number of message objects associated with the data object version currently in process is zero; and based on the determination that the number of message objects associated with the data object version currently in process is zero, updating the version mapping from the message object version to a different message object version.

In an embodiment, a method or non-transitory computer readable medium comprises: wherein determining the topic associated with the message object includes identifying one or more characteristics associated with the message object.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 14:
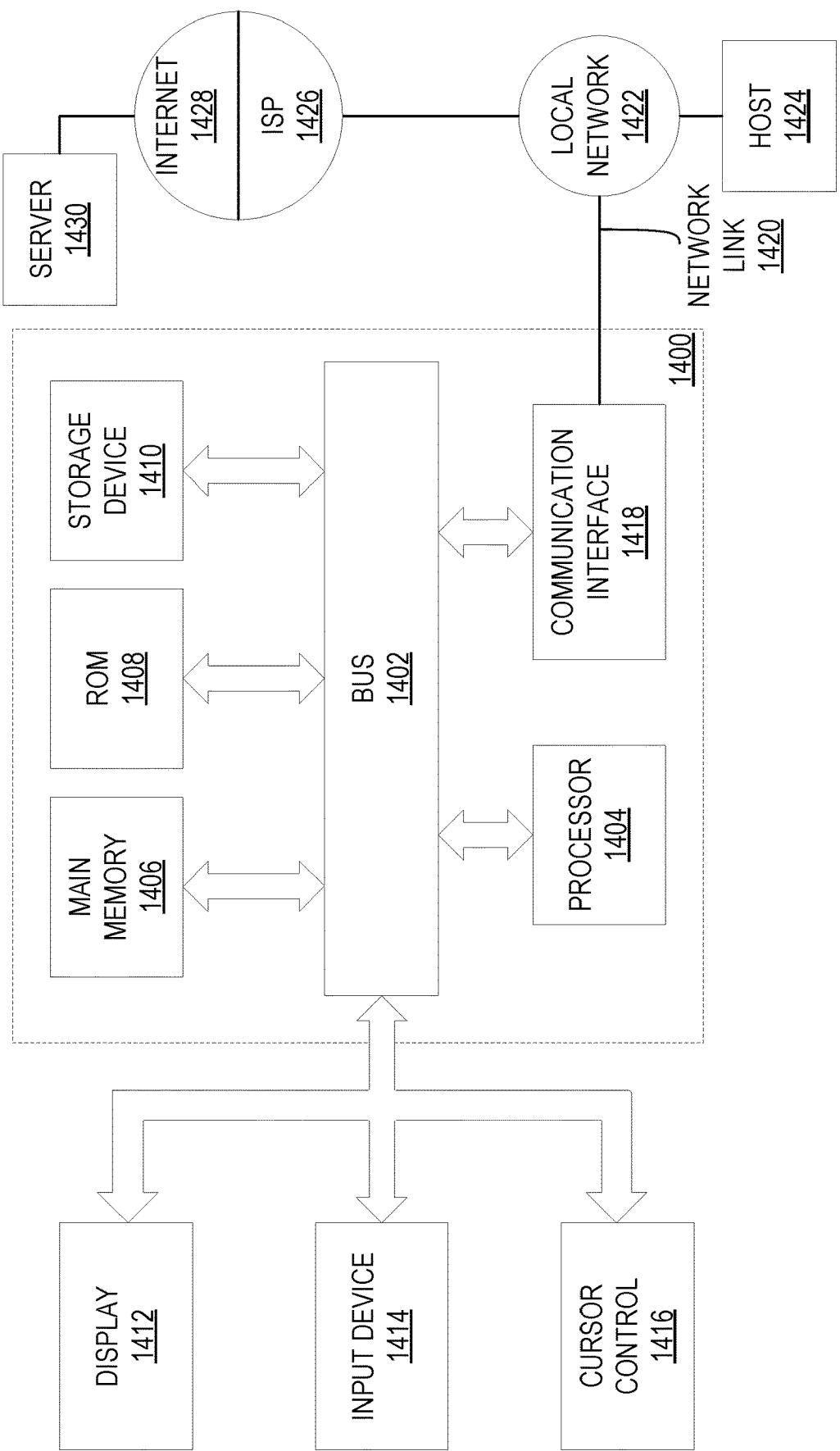
FIG. 14 illustrates a computer system upon which an embodiment may be implemented.

FIG. 14 is a block diagram that illustrates a computer system 1400 utilized in implementing the above-described techniques, according to an embodiment. Computer system 1400 may be, for example, a desktop computing device, laptop computing device, tablet, smartphone, server appliance, computing mainframe, multimedia device, handheld device, networking apparatus, or any other suitable device.

Computer system 1400 includes one or more buses 1402 or other communication mechanism for communicating information, and one or more hardware processors 1404 coupled with buses 1402 for processing information. Hardware processors 1404 may be, for example, general purpose microprocessors. Buses 1402 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1400 also includes a main memory 1406, such as a random access memory (RAM) or other dynamic or volatile storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 a special-purpose machine that is customized to perform the operations specified in the instructions.

Computer system 1400 further includes one or more read only memories (ROM) 1408 or other static storage devices coupled to bus 1402 for storing static information and instructions for processor 1404. One or more storage devices 1410, such as a solid-state drive (SSD), magnetic disk, optical disk, or other suitable non-volatile storage device, is provided and coupled to bus 1402 for storing information and instructions.

Computer system 1400 may be coupled via bus 1402 to one or more displays 1412 for presenting information to a computer user. For instance, computer system 1400 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1412 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1412.

One or more input devices 1414 are coupled to bus 1402 for communicating information and command selections to processor 1404. One example of an input device 1414 is a keyboard, including alphanumeric and other keys. Another type of user input device 1414 is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. Yet other examples of suitable input devices 1414 include a touch-screen panel affixed to a display 1412, cameras, microphones, accelerometers, motion detectors, and/or other sensors. In an embodiment, a network-based input device 1414 may be utilized. In such an embodiment, user input and/or other information or commands may be relayed via routers and/or switches on a Local Area Network (LAN) or other suitable shared network, or via a peer-to-peer network, from the input device 1414 to a network link 1420 on the computer system 1400.

A computer system 1400 may implement techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1400 can receive the data on the network and demodulate the signal to decode the transmitted instructions. Appropriate circuitry can then place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

A computer system 1400 may also include, in an embodiment, one or more communication interfaces 1418 coupled to bus 1402. A communication interface 1418 provides a data communication coupling, typically two-way, to a network link 1420 that is connected to a local network 1422. For example, a communication interface 1418 may be an integrated services digital network (ISDN) card, cable modem, satellite modem, or a modem to provide a data communication connection to a corresponding type of telephone line. As another example, the one or more communication interfaces 1418 may include a local area network (LAN) card to provide a data communication connection to a compatible LAN. As yet another example, the one or more communication interfaces 1418 may include a wireless network interface controller, such as a 802.11-based controller, Bluetooth controller, Long Term Evolution (LTE) modem, and/or other types of wireless interfaces. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by a Service Provider 1426. Service Provider 1426, which may for example be an Internet Service Provider (ISP), in turn provides data communication services through a wide area network, such as the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

In an embodiment, computer system 1400 can send messages and receive data, including program code and/or other types of instructions, through the network(s), network link 1420, and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage device 1410, or other non-volatile storage for later execution. As another example, information received via a network link 1420 may be interpreted and/or processed by a software component of the computer system 1400, such as a web browser, application, or server, which in turn issues instructions based thereon to a processor 1404, possibly via an operating system and/or other intermediate layers of software components.

In an embodiment, some or all of the systems described herein may be or comprise server computer systems, including one or more computer systems 1400 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method performed by a microservice of a microservice-based system including a plurality of microservices, the method comprising:
   receiving a message object from a first communication microservice of a plurality of communication microservices;
   in response to receiving the message object, identifying:
      a first message object version associated with the message object,
      a data object version associated with the first message object version, and
      a statistics entry indicating a number of message objects associated with the data object version that are currently being processed by any of the plurality of microservices;
   determining, based on the statistics entry, that the number of message objects associated with the data object version currently being processed by any of the plurality of microservices is zero; and
   based on determining that the number of message objects associated with the data object version currently being processed by any of the plurality of microservices is zero, updating a version mapping from the first message object version to a second message object version.

2. The method of claim 1, further comprising:
   receiving a data object associated with the data object version, the data object to be sent to another security microservice of the plurality of microservices;
   determining, based on the version mapping, to use the second message object version to encapsulate the data object as a message object; and
   sending the message object encapsulated using the second message object version to a second communication microservice that is different from the first communication microservice.

3. The method of claim 1, wherein, in response to receiving the message object, the microservice further identifies a topic associated with the message object, wherein the topic is one of a plurality of topics of a publish-subscribe messaging system.

4. The method of claim 1, further comprising sending a data object associated with the data object version to another process of the microservice.

5. The method of claim 1, further comprising, in response to receiving the message object associated with the first message object version, updating the number of message objects associated with the data object version currently being processed by any of the plurality of microservices.

6. The method of claim 1, wherein the statistics entry includes a message counter indicating the number of message objects associated with the data object version currently being processed by any microservice of the plurality of microservices.

7. A computer-implemented method performed by a microservice of a microservice-based system including a plurality of microservices, the method comprising:
   generating a data object associated with a data object version;
   determining a topic associated with the data object, wherein the topic is one of a plurality of topics of a publish-subscribe messaging system;
   identifying, based on the topic, a mapping between the data object version and a message object version;
   updating a statistics entry associated with the data object version, the statistics entry indicating that the data object associated with the data object version, encapsulated in a message object associated with the message object version, is being sent to a communication microservice; and
   sending the message object to the communication microservice.

8. The method of claim 7, wherein the communication microservice is selected from a plurality of communication microservices based on the message object version associated with the message object.

9. The method of claim 7, further comprising:
   receiving, by the microservice, a message object from the communication microservice;
   in response to receiving the message object, identifying:
      a message object version associated with the message object,
      a data object version associated with the message object, and
      a statistic entry indicating a number of message objects associated with the data object version that are currently being processed by any of the plurality of microservices;
   determining, based on the statistics entry, that the number of message objects associated with the data object version currently being processed by any of the plurality of microservices is zero; and based on determining that the number of message objects associated with the data object version currently being processed by any of the plurality of microservices is zero, updating a version mapping from the message object version to a different message object version.

10. The method of claim 7, wherein determining the topic associated with the message object includes identifying one or more characteristics associated with the message object.

11. A non-transitory machine-readable storage medium storing instructions which, when executed by a processor, cause performance of operations comprising:
receiving, by a microservice of a plurality of microservices, a message object from a first communication microservice of a plurality of communication microservices;
in response to receiving the message object, identifying:
a first message object version associated with the message object,
a data object version associated with the first message object version, and
a statistics entry indicating a number of message objects associated with the data object version that are currently being processed by any of the plurality of microservices;
determining, based on the statistics entry, that the number of message objects associated with the data object version currently being processed by any of the plurality of microservices is zero; and
based on determining that the number of message objects associated with the data object version currently being processed by any of the plurality of microservices is zero, updating a version mapping from the first message object version to a second message object version.

12. The non-transitory machine-readable storage medium of claim 11, further comprising instructions which, when executed by the processor, cause performance of operations comprising:
receiving a data object associated with the data object version, the data object to be sent to another security microservice of the plurality of microservices;
determining, based on the version mapping, to use the second message object version to encapsulate the data object as a message object; and
sending the message object encapsulated using the second message object version to a second communication microservice that is different from the first communication microservice.

13. The non-transitory machine readable storage medium of claim 11, wherein, in response to receiving the message object, the microservice further identifies a topic associated with the message object, wherein the topic is one of a plurality of topics of a publish-subscribe messaging system.

14. The non-transitory machine-readable storage medium of claim 11, further comprising instructions which, when executed by the processor, cause performance of operations comprising sending a data object associated with the data object version to another process of the microservice.

15. The non-transitory machine-readable storage medium of claim 11, further comprising instructions which, when executed by the processor, cause performance of operations comprising, in response to receiving the message object associated with the first message object version, updating the number of message objects associated with the data object version currently being processed by any of the plurality of microservices.

16. The non-transitory machine-readable storage medium of claim 11, wherein the statistics entry includes a message counter indicating the number of message objects associated with the data object version currently being processed by any microservice of the plurality of microservices.

17. A non-transitory machine-readable storage medium storing instructions which, when executed by a processor, cause performance of operations comprising:
generating, by a microservice of a plurality of microservices, a data object associated with a data object version;
determining a topic associated with the data object, wherein the topic is one of a plurality of topics of a publish-subscribe messaging system;
identifying, based on the topic, a mapping between the data object version and a message object version;
updating a statistics entry associated with the data object version, the statistics entry indicating that the data object associated with the data object version, encapsulated in a message object associated with the message object version, is being sent to a communication microservice; and
sending the message object to the communication microservice.

18. The non-transitory machine-readable storage medium of claim 17, wherein the communication microservice is selected from a plurality of communication microservices based on the message object version associated with the message object.

19. The non-transitory machine-readable storage medium of claim 17, further comprising instructions which, when executed by the processor, cause performance of operations comprising:
receiving, by the microservice, a message object from the communication microservice;
in response to receiving the message object, identifying:
a message object version associated with the message object,
a data object version associated with the message object, and
a statistic entry indicating a number of message objects associated with the data object version that are currently being processed by any of the plurality of microservices;
determining, based on the statistics entry, that the number of message objects associated with the data object version currently being processed by any of the plurality of microservices is zero; and
based on determining that the number of message objects associated with the data object version currently being processed by any of the plurality of microservices is zero, updating a version mapping from the message object version to a different message object version.

20. The non-transitory machine-readable storage medium of claim 17, wherein determining the topic associated with the message object includes identifying one or more characteristics associated with the message object.

* * * * *